United States Patent [19]
Kunig

[11] Patent Number: 5,241,901
[45] Date of Patent: Sep. 7, 1993

[54] APPARATUS FOR SEPARATING MIXED SUBSTANCES SUCH AS FOODSTUFFS

[75] Inventor: Helmut Kunig, Bad Schwartau, Fed. Rep. of Germany

[73] Assignee: Nordischer Maschinenbau Rud. Baader GmbH & Co. KG, Lubeck, Fed. Rep. of Germany

[21] Appl. No.: 886,097

[22] Filed: May 21, 1992

[30] Foreign Application Priority Data

May 21, 1991 [DE] Fed. Rep. of Germany ....... 4116476

[51] Int. Cl.⁵ .................... A22C 17/04; A23N 1/00; B30B 9/20
[52] U.S. Cl. ........................ 99/495; 99/460; 99/464; 99/466; 100/121; 100/153
[58] Field of Search ............ 99/495, 509, 510; 100/121, 152, 153, 72; 210/400, 783; 452/198, 182, 125, 127, 138

[56] References Cited

U.S. PATENT DOCUMENTS

| Re. 30,268 | 5/1980 | Justus | 100/153 |
|---|---|---|---|
| 525,525 | 9/1894 | Anderson | 100/152 |
| 2,365,658 | 12/1944 | Schumacher | 100/121 |
| 3,943,735 | 3/1976 | Riedel | 68/5 R |
| 3,973,483 | 8/1976 | Appenzeller | 100/153 |
| 4,156,384 | 5/1979 | Hinds, Jr. et al. | 99/465 |
| 4,206,696 | 6/1980 | Grant et al. | 100/121 |
| 4,697,511 | 10/1987 | Davis et al. | 210/400 |
| 4,826,595 | 5/1989 | Franke | 210/783 |
| 5,085,140 | 2/1992 | Kunig | 452/198 |
| 5,103,720 | 4/1992 | Rose et al. | 99/495 |

FOREIGN PATENT DOCUMENTS

| 853139 | 10/1970 | Canada. |
|---|---|---|
| 3516623C2 | 11/1985 | Fed. Rep. of Germany. |
| 8706282 | 10/1987 | PCT Int'l Appl. ........ 100/121 |

Primary Examiner—Timothy F. Simone
Attorney, Agent, or Firm—Fay, Sharpe, Beall, Fagan, Minnich & McKee

[57] ABSTRACT

A device is described relating to separating mixed substances of differing flowabilities, in particular for the purpose of processing foodstuffs. The processing takes place in a device by which an elastic presser belt is pressed onto the periphery of a hollow separating drum with a perforated wall, so that the substance to be processed consisting of the previously mentioned composition and located between the presser belt and the hollow separating drum is separated into a phase of easily and a phase of less easily flowable components. The present concept provides for the use of two presser belt systems, which are operative one in series with and downstream of the other and influence a hollow separating drum, thus offering the possibility of using presser belts of different softness as well as, in the case of offset arrangement of the presser belt systems, use of varying perforations in the respectively associated circumferential areas.

20 Claims, 1 Drawing Sheet

APPARATUS FOR SEPARATING MIXED SUBSTANCES SUCH AS FOODSTUFFS

BACKGROUND OF THE INVENTION

1. Field of the Invention

The invention relates to an apparatus for separating mixed substances of differing flowabilities, in particular in the processing of foodstuffs, the foodstuff to be processed being pressed, by means of an elastic, endless presser belt, against a hollow separating drum driven to rotate and having a perforated circumferential surface, for which purpose said presser belt is guided while enclosing part of said circumferential surface of said hollow drum and forming therewith a pressure zone as well as a draw-in wedge for said substances to be processed, and pressure exerting means are arranged for pressing said presser belt against said separating drum.

With this kind of device, generally referred to as separator, substances and mixtures of substances can be subjected to a separating process by which a separation of substances of differing flowabilities takes place. Thus, assisted by this process, the possibility exists to separate e.g. fish flesh from bones and skin, various kinds of meat from bones, tendons, ligaments, sinews and skins, fruit e.g. apples from skin/peel, pits, stems stems etc., butter and cheese from packaging material—e.g. for unpacking incorrect packaging—and much more.

This kind of processing shows that every substance to be treated can only be optimally processed according to its consistency and mixture by using certain variables or setting parameters, this statement aiming particularly at characteristics of quality and rather less at those of quantity, i.e. yield. If upon optimizing quality it is hitherto determined that this, for example, causes reduced yield, it is either accepted as such or the remainder of the substance to be processed is subjected to a second separating treatment according to other parameters. By this manner of procedure, it is also possible to obtain specific products having different levels of quality.

2. Prior Art

For the last-mentioned possiblity, a press-passing machine is provided, which can be taken from DE-PS 35 16 623. This machine is designed for removing the flesh of fish by separating it from bones and comprises for the purpose of producing different levels of qualtity a presser belt, which communicates with two separating drums positioned one behind the other. Each separating drum is associated with an individual pressure exerting system, so that the working parameters, such as pressing force, diameter of the holes in the separating drum, and drum diameter, can be defined and designed differently. The yield of meat parts of varying levels of quality is obtained through utilisation of the circumstance that the meat of less quality lies under the skin and is thus more strongly connected to the skin, so that the detachment thereof requires a higher pressure of the presser belt against the drum than the detachment of the remaining meat portions.

Disadvantageous in this configuration is the use of two drums, which are very costly in respect of production, positioning (support) and drive, as well as the additional straining of the presser belt, which is already subject to a high degree of wear. Furthermore, due to this system the hardness and consistency of the presser belt principally effects both separating drums in the same manner, i.e. mutually.

SUMMARY OF THE INVENTION

It is the main aim of the present invention to provide an apparatus for overcoming the drawbacks of the prior art structure.

It is thus a major object of the invention to suggest separator means, with the help of which a multi-step treatment can be carried out.

It is a further essential object of the present invention to enable such multi-step treatment being performed under respectively individual adaptation possibilities with regard to the working parameters.

In an apparatus comprising an elastic, endless presser belt means and a hollow separating drum driven to rotate and having a perforated circumferential surface against which the material to be processed is pressed by the presser belt means, for which purpose the presser belt means is guided while enclosing part of said circumferential surface of said hollow drum and forming therewith a pressure zone as well as a draw-in wedge for said material to be processed, and further comprising pressure exerting means arranged for pressing said presser belt means against said separating drum, these objects are achieved, according to the present invention, by the features that the presser belt means is designed in the form of a first presser belt and a second presser belt each provided with respective pressure exerting means and each associated to the separating drum, the first and second presser belts being arranged such that they cover different sectors of said circumferential surface of said separating drum.

According to a basic embodiment, the first presser belt and the second presser belt can be arranged in the same plane and under the formation of pressure zones which essentially face each other. A universal concept is obtained, however, if the first and the second presser belts are arranged laterally offset when viewed in the direction of the axis of rotation of the separating drum. In such arrangement, the amount of this offsetting corresponds at least to the width of one of said presser belts or it can be smaller than such width.

For accommodating to the reduced quantity of substance under treatment which is to be processed by the second separating step, the width of the second presser belt can be smaller than that of the first presser belt. In order to transfer the substance to be processed out of the area of the first presser belt into the area of the second presser belt, downstream of the first presser belt a first stripping device can be arranged for stripping-off of remainders of said processed substances after passing said first presser belt, which first stripping device includes a first stripping blade. This may be arranged to extend in a slanted manner with the periphery of the separating drum relative thereto. By means of a second stripping device located downstream of the second presser belt the substance to be processed which has remained following the second pressing step can be stripped from the periphery of the hollow separating drum for delivery out of the machine. For this purpose a stripping blade can be preferably provided, which extends essentially parallel to the axis of rotation of the separating drum and essentially over the whole perforated area of said drum, in order to catch any of the substance to be processed which has remained in the first pressure zone.

The offset arrangement of the pressing belts is advantageous in that it enables equipping the hollow separating drum such that both presser belts are each individually associated with circumferential areas of the hollow separating drum having different perforations. Thereby, a particularly economical and universal concept is produced, if the hollow separating drum is composed of two drum sections arranged side by side axially, a first section being associated with said first presser belt and a second section being associated with said second presser belt.

For delivering the substance to be processed, a delivering device associated with said second stripping device is appropriate, which delivering device comprises an endless conveyor belt having a width essentially corresponding to the width of said second presser belt, the arrangement of said conveyor belt being such that its run facing said second presser belt opposes said second presser belt while elastically covering a considerable portion thereof.

Finally, the arrangement of a discharging device inside said hollow separating drum, which discharge device divides the internal space of said drum for mutually sealing the internal space portions of the hollow separating drum associated with the two pressure zones of said first and second presser belts, respectively, thus enables separate delivery of both processing phases or flows.

BRIEF DESCRIPTION OF THE DRAWINGS

Other and further objects of the present invention will be apparent from the following description and claims and are illustrated in the accompanying drawings, which by way of schematic representation show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

In the drawings

DETAILED DESCRIPTION OF THE DRAWINGS

Figure 1:
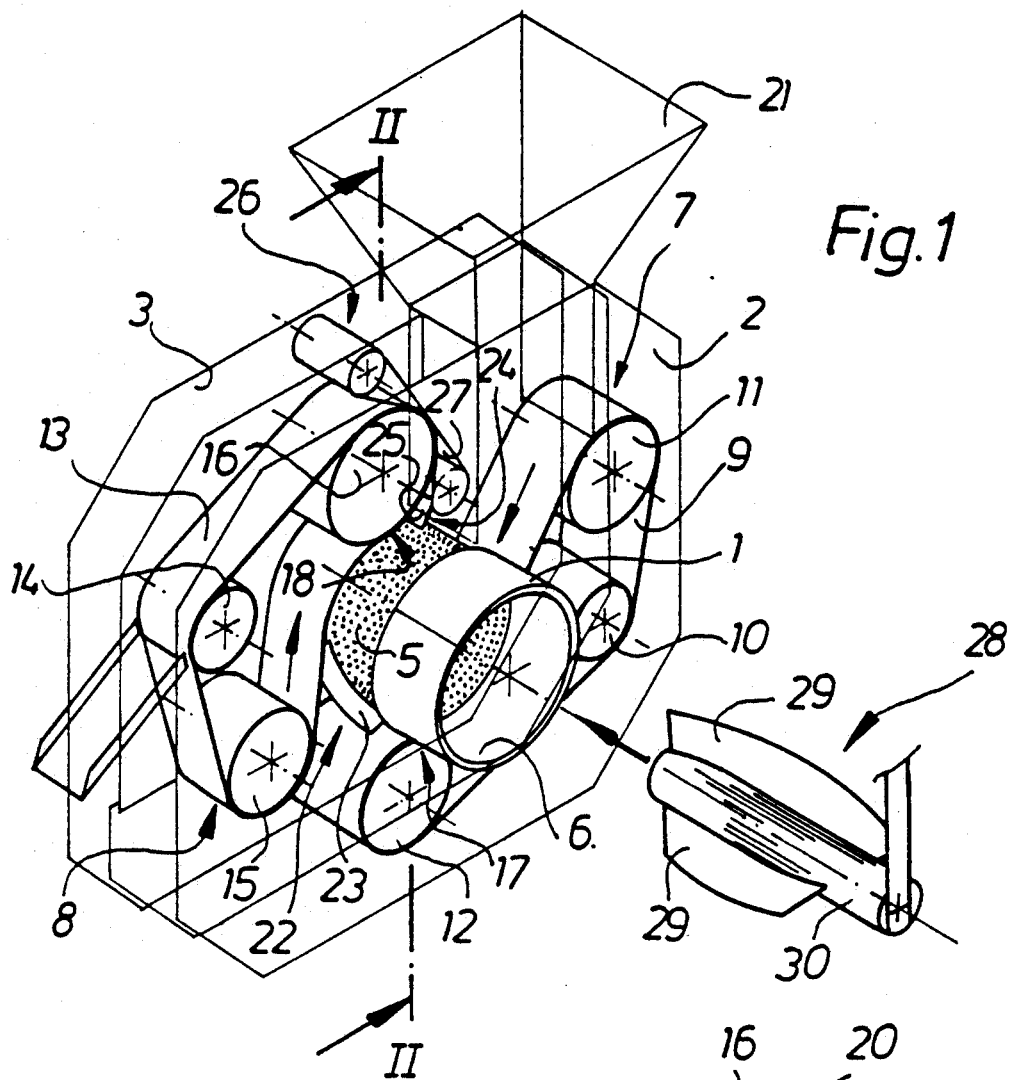
FIG. 1 shows a general view of the apparatus according to the invention in axonometric representation.

Mounted in a frame of a pressure belt separator, which frame is not shown here for purposes of easier comprehension and which comprises gears, transmissions, bearings, adjustment mechanisms etc., is hollow separating drum 1 appropriately mounted and driven to rotate. As such, the hollow separating drum 1 passes through a functional space, which is laterally bounded by a first and a second lateral wall 2 and 3, respectively, which are depicted in FIG. 1 as "glass" elements. The drum 1 is perforated, in the region of this functional space, on its periphery 4 by means of openings 5, which penetrate the drum's wall. The hollow separating drum 1 is designed in the shape of a pot and is connected by its closed end with the drive mechanism. The open end projects outwardly from the first lateral wall 2 in the form of a tube-shaped section 6 and is mounted in the wall 2 to rotate on not-shown external support bearings.

Figure 2:
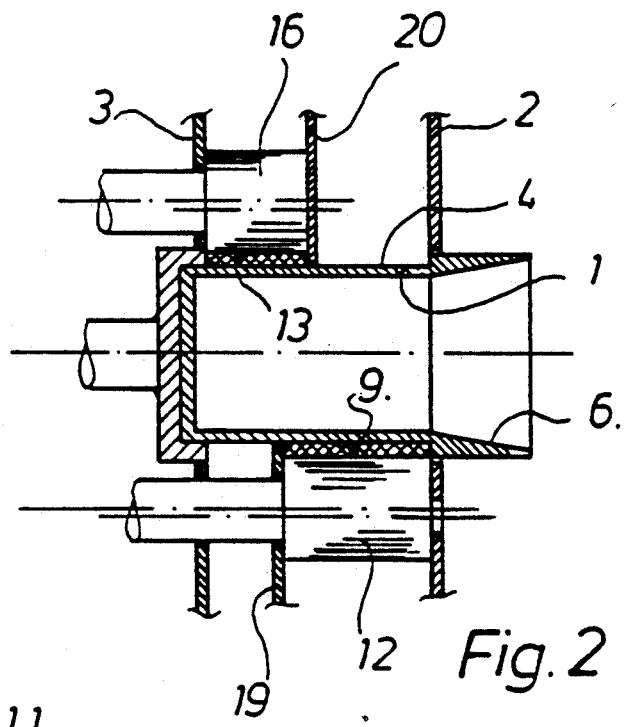
FIG. 2 shows a cross-section through the apparatus according to FIG. 1 along the section line II—II.

Arranged in the working area are a first and a second presser belt system 7 and 8, respectively. Each of these systems comprises a first and a second endless, flexible presser belt 9 and 13, respectively, which are guided over respective deflection rollers 10 and 14, tensioning rollers 11 and 15 and pressure exerting rollers 12 and 16, such that they enclose at least a part each of the hollow separating drum 1 on the periphery thereof. Thereby, the arrangement of the presser belts 9 and 13 is such that the first belt 9 encloses the hollow separating drum 1 on its downwardly facing periphery, whereas the enclosing region of the second presser belt 13 is positioned facing upwardly. In this manner, a first pressure zone 17 is formed by the first presser belt 9 such that the pressing openings or pressing pressures, respectively, can be adjusted radially with respect to the hollow separating drum 1, preferably by means of a cam or an eccentric means. The presser belts 9 and 13 rotate in offset planes such that the first presser belt 9 rotates in a slide seal manner between the inner surfaces of the first lateral wall 2 and a first partition wall 19, while the second presser belt 13 is guided in a similar manner between the inner surfaces of the second lateral wall 3 and a second partition wall 20. To enable better viewing relative to the construction of the machine, the two partition walls 19 and 20, like the lateral walls 2 and 3, are shown in FIG. 1 as "glass" elements, whereas they appear in section in FIG. 2.

Located over the run-on position of the first presser belt 9 onto the hollow separating drum 1 is a supply funnel 21 provided with a supply or filling shaft, which is formed by the first lateral wall 2 and the first partition wall 19 as well as by transverse walls which are extending downward into the vicinity of the hollow separating drum 1 and the first presser belt 9. Located in the region of the run-off position of the first presser belt 9 from the hollow separating drum 1 is a first stripping device 22, which can be adjusted to the smallest possible gap relative to the periphery 4 of the hollow separating drum 1 and which, along with a first stripping blade 23, follows a turn or thread and extends across the width of the first presser belt 9 and opens into the run-on area of the second presser belt 13. Arranged in the run-on area of the second presser belt 13 a further, second stripping device 24 is arranged. This comprises a second stripping blade 25, which can be adjusted to the smallest possible gap with regard to the periphery 4 of the hollow separating drum 1 and is designed essentially parallel to the (imaginary) surface lines of the hollow separating drum 1 and overlaps said lines corresponds at least over the width of the second presser belt 13. The second stripping blade 25 leads upto the operative area of a delivering device 26, which comprises an endless, elastic conveyor belt 27 having the width of the second presser belt 13, such that it is guided to overlap belt 13 over a portion of the second pressure exerting roller 16.

For delivery of the usable portions of the substance to be processed entering into the hollow separating drum 1, a discharging device 28 is provided. This comprises two helically threaded webs 29, which are located on a carrier hub 30 and mounted such that they lie opposite each other following a lefthand (anti-clockwise) twist. The entire device is designed such that it can be pushed into the hollow separating drum 1 and in this position can be detachably connected with the machine frame.

The manner in which the previously described apparatus for separating functions is as follows: The substance to be processed, which has been brought via the supply funnel 21 onto the hollow separating drum 1 in the area of the run-on position of the first presser belt 9, is pulled or drawn into the enclosing area between the hollow separating drum 1 and the first presser belt 9 as a result of the rotation of these two parts and is first charged with pressure under the radial pressing component resulting from the tension of the first presser belt 9. At this time, the first, more easily flowable components detach from the substance to be processed and enter into the internal space of the hollow separating drum 1 through the openings 5 in the wall thereof. The less easily flowable components remain between the first presser belt 9 and the hollow separating drum 1 and are then subjected to an increasing pressure which reaches its peak in the first pressure zone 17, which zone can be influenced by means of the first pressure exerting roller 12. The greater portion of the flowable components of the substance to be processed is pressed off in this zone. The remainder of the substance to be processed, which consists predominantly of components which are either non-flowable or flowable only with difficulty, after passing through the the first pressure zone 17 is released from the hollow separating drum 1 at the run-off section of the first presser belt 9, whereby in general, it remains on the periphery 4 of the hollow separating drum 1, adhering thereto in the form of a web or fleece consisting of the substance to be processed. This remainder is consequently entrained by the hollow separating drum 1 into the operative area of the first stripping device 22, which, assisted by the first stripping blade 23, lifts the fleece off of the periphery 4 of the hollow separating drum 1. During this process, as a result of the helix-shaped convolution of the first stripping blade 23 the remainder is transferred over to the run-on region of the second presser belt 13 onto the hollow separating drum 1 and is prevented from falling out of the machine due to gravitational force by not-shown holding means.

With the lifting-off of the substance web by the first stripping blade 23 a reorientation of the substance begins before the next pressing process, this step being desirable because it leads to increased yield in the entire process.

The remainder of the substance to be processed is now subjected to a second pressing process, which is carried out in a manner corresponding to that of the first process, the remaining components of the flowable material being pressed off in the second pressing zone 18, which can be influenced by means of the second pressure exerting roller 16 such that these components reach the internal space of the hollow separating drum 1 as well. The final remainder of the substance to be processed is then lifted away from the periphery 4 of the hollow separating drum 1 by the second stripping device 24 and brought into the collecting area of the delivery device 26 by means of the second stripping blade 25. The conveyor belt 27 thereof provides for removal of the remaining substance from the machine.

The accumulated usable substance located in the interior of the hollow separating drum 1 can be carried out of the hollow separating drum 1 by the discharging device 28, which is equipped with two webs 29, which essentially oppose each other, and thus enable separate discharge of the two pressing phases.

Figure 3:
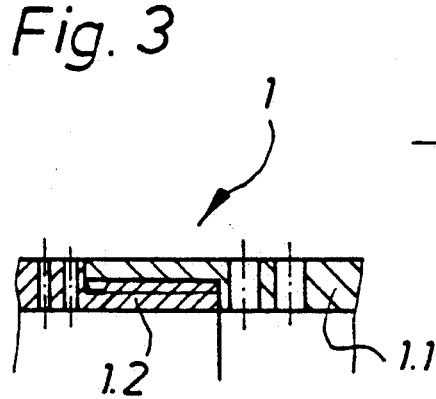
FIG. 3 shows in detail and by way of a partially sectional view a modified hollow separating drum.

This possibility could be of importance if the two pressing phases are of differing quality. Therefore, separate further utilization may be practical and expedient. Thus, for example, a first pressing phase may be produced by comparatively low pressure and followed by another produced by higher pressure. To this end, in addition to presser belts of differing softness, such a process could also use different perforations over the circumferential areas of the hollow separating drum 1 associated with each of the presser belts. By designing the hollow separating drum 1 of composable first and second drum sections 1.1 and 1.2, respectively, according to FIG. 3, a possibility is provided to carry out an economical and cost-saving adaptation under widely varying perspectives.

What is claimed is:

1. An apparatus for processing mixed substances of differing flowabilities, in particular in the processing of foodstuffs by separating, said apparatus comprising
    a) hollow separating drum means driven to rotate about an axis of rotation and having a perforated circumferential surface;
    b) elastic endless presser belt means for pressing said substances to be processed against said perforated circumferential surface of said drum means, said presser belt means being guided for enclosing part of said circumferential surface of said drum means and forming therewith a pressure zone and a draw-in area for said substances to be processed; and
    c) pressure exerting means arranged for pressing said presser belt means against said surface of said drum; wherein said presser belt means has at least a first presser belt means and a second presser belt means each provided with respective pressure exerting means and each being associated with a different circumferential sector of said drum means, and wherein said at least first and said second presser belt means are arranged such that they cover said different sectors of said circumferential surface of said drum means to define at least two pressure zones and wherein said at least first and second presser belt means are arranged laterally offset with respect to each other when viewed in the direction of the axis of rotation of said drum means.

2. An apparatus as claimed in claim 1, wherein said at least first and second presser belt means are arranged laterally offset by an amount corresponding to at least a width of one of said at least first and second presser belt means.

3. An apparatus as claimed in claim 1, wherein said at least first and second presser belt means are arranged laterally offset by an amount less than a width of one of said at least first and second presser belt means.

4. An apparatus as claimed in claim 1, wherein a width of said second presser belt means is smaller than that of said first presser belt means.

5. An apparatus as claimed in claim 2, wherein the width of said second presser belt means is smaller than that of said first presser belt means.

6. An apparatus as claimed in claim 3, wherein the width of said second presser belt means is smaller than that of said first presser belt means.

7. An apparatus as claimed in claim 3, wherein downstream of said first presser belt means a first stripping device is arranged for stripping-off of remainders of said substances to be processed after passing said first presser belt means, which first stripping device includes a first stripping blade which is arranged to extend in a slanted manner relative to a periphery of said drum means.

8. An apparatus as claimed in claim 4, wherein downstream of said first presser belt means a first stripping device is arranged for stripping-off of remainders of said substances to be processed after passing said first presser belt means, which first stripping device includes a first stripping blade which is arranged to extend in a slanted manner relative to the periphery of said drum means.

9. An apparatus as claimed in claim 5, wherein downstream of said first presser belt means a first stripping device is arranged for stripping-off of remainders of said substances to be processed after passing said first presser belt means, which first stripping device includes a first stripping blade which is arranged to extend in a slanted manner relative to the periphery of said drum means.

10. An apparatus as claimed in claim 6, wherein downstream of said first presser belt means a first stripping device is arranged for stripping-off of remainders of said substances to be processed after passing said first presser belt means, which first stripping device includes a first stripping blade which is arranged to extend in a slanted manner relative to the periphery of said drum means.

11. An apparatus as claimed in claim 1, wherein downstream of said second presser belt means there is arranged a stripping device for stripping-off of remainders of said substances to be processed from the periphery of said drum means, said second stripping-device including a second stripping blade which extends essentially parallel to the axis of rotation of said drum, means and essentially over the whole perforated surface of said drum means.

12. An apparatus as claimed in claim 7, wherein downstream of said second presser belt means there is arranged a second stripping device for stripping-off of remainders of said substances to be processed from the periphery of said drum means, said second stripping-device including a second stripping blade which extends essentially parallel to the axis of rotation of said drum means and essentially over the whole perforated surface of said drum means.

13. An apparatus as claimed in claim 3, wherein circumferential surface portions of said drum means associated with said at least first and said second presser belts, respectively, are provided with different perforations.

14. An apparatus as claimed in claim 12, wherein circumferential surface portions of said drum means associated with said at least first and said second presser belts, respectively, are provided with different perforations.

15. An apparatus as claimed in claim 3, wherein said drum means is composed of at least two drum sections axially arranged side by side, with at least a first section being associated with said first presser belt means and a second section being associated with said second presser belt means.

16. An apparatus as claimed in claim 14, wherein said drum means is composed of at least two drum sections axially arranged side by side, with at least a first section being associated with said first presser belt means and a second section being associated with said second presser belt means.

17. An apparatus as claimed in claim 11, which apparatus further comprises a delivering device associated with said second stripping device, which delivering device comprises an endless conveyor belt means having a width essentially corresponding to the width of said second presser belt means, the arrangement of said conveyor belt means being such that its run facing said second presser belt means opposes said second presser belt means while elastically covering a considerable portion thereof.

18. An apparatus as claimed in claim 14, which apparatus further comprises a delivering device associated with said second stripping device, which delivering device comprises an endless conveyor belt means having a width essentially corresponding to the width of said second presser belt means, the arrangement of said conveyor belt means being such that its run facing said second presser belt means opposes said second presser belt means while elastically covering a considerable portion thereof.

19. An apparatus as claimed in claim 1, wherein a discharging device is arranged inside said hollow drum means, which discharging device divides the internal space of said drum means for mutually sealing the internal space portions of said drum means associated with said at least two pressure zones of said at least first and second presser belt means, respectively.

20. An apparatus as claimed in claim 18, wherein a discharging device is arranged inside said hollow drum means, which discharging device divides the internal space of said drum means for mutually sealing the internal space portions of said drum means associated with said at least two pressure zones of said at least first and second presser belt means, respectively.

* * * * *